(12) United States Patent
Matsumura

(10) Patent No.: US 7,344,152 B2
(45) Date of Patent: Mar. 18, 2008

(54) AIRBAG DEVICE

(75) Inventor: Shinzo Matsumura, Shiga (JP)

(73) Assignee: Takata Corporation, Tokyo (JP)

( * ) Notice: Subject to any disclaimer, the term of this patent is extended or adjusted under 35 U.S.C. 154(b) by 518 days.

(21) Appl. No.: 10/981,543

(22) Filed: Nov. 5, 2004

(65) Prior Publication Data

US 2005/0098987 A1    May 12, 2005

Related U.S. Application Data

(60) Provisional application No. 60/517,923, filed on Nov. 7, 2003.

(51) Int. Cl.
*B60R 21/16* (2006.01)

(52) U.S. Cl. .................. 280/731; 428/34.1; 442/76

(58) Field of Classification Search ............... 428/34.1; 442/76; 280/731
See application file for complete search history.

(56) References Cited

U.S. PATENT DOCUMENTS

| | | | |
|---|---|---|---|
| 3,831,972 A | 8/1974 | Allgaier et al. | |
| 4,169,613 A | 10/1979 | Barnett | |
| 5,562,302 A | 10/1996 | Turnbull | |
| 5,775,725 A * | 7/1998 | Hodac et al. | 280/728.2 |
| 5,806,881 A | 9/1998 | Richter et al. | |
| 5,944,345 A * | 8/1999 | Hirai | 280/743.1 |
| 5,945,184 A | 8/1999 | Nagata et al. | |
| 6,361,072 B1 | 3/2002 | Barnes | |
| 6,429,155 B1 * | 8/2002 | Li et al. | 442/76 |
| 6,467,806 B2 | 10/2002 | Gilpatrick et al. | |
| 2006/0252322 A1 * | 11/2006 | DeBenedictis et al. | 442/59 |

* cited by examiner

*Primary Examiner*—Arti Singh
(74) *Attorney, Agent, or Firm*—Foley & Lardner LLP

(57) ABSTRACT

An airbag device for protecting a vehicle occupant. The airbag device includes an airbag module including an airbag. The airbag module is configured to be disposed on a steering wheel body of a steering wheel of the vehicle. The ratio of a weight of the airbag device to a weight of the steering wheel body is no less than approximately 1:6 and no greater than approximately 1:2.

23 Claims, 3 Drawing Sheets

AIRBAG DEVICE

This application claims benefit of U.S. Provisional Application No. 60/517,923, filed Nov. 7, 2003.

BACKGROUND

The present invention relates to an airbag device (i.e., an airbag module) in which an airbag is inflated to protect a vehicle occupant in the event of a vehicle emergency, such as a collision. More particularly, the present invention relates to an airbag device in which the ratio of the weight of the airbag device to the weight of the steering wheel body is set in order to provide an airbag with reduced weight to keep the vehicle weight down.

An airbag for protecting a vehicle occupant is usually stored in a folded state in a recess disposed in the middle section of a steering wheel of a vehicle or within an instrument panel of a vehicle. In the event of a vehicle emergency, such as a collision, the airbag is deployed and inflated in the vehicle interior by gas produced by an inflator. The inflated airbag receives and retains an occupant.

Conventionally, a fabric for use in an airbag of an airbag device is normally a woven fabric made of synthetic filament yarns having fineness from 500 denier to 630 denier and coated with an elastomer or the like. The conventional base fabric is quite thick because the woven fabric itself is thick and is additionally coated with resin. The folded airbag therefore has a large volume and is heavy. As a result, with conventional airbag devices, the weight of a driver side airbag device and steering wheel may be heavy such that the steering wheel becomes difficult to turn. In such cases, the weight of the vehicle in which the airbag device is mounted is also heavy. Conversely, if the weight of the airbag device and steering wheel is too light, the steering wheel experiences vibration.

SUMMARY OF THE INVENTION

According to an embodiment of the present invention, an airbag device (i.e., an airbag module) is provided. The airbag device includes a folded airbag, a retainer to which the airbag is mounted, an inflator (gas generator) for deploying the airbag, and a module cover covering the airbag. The airbag device is disposed on a steering wheel body of a vehicle. The airbag device and the steering wheel body together comprise the steering wheel of the vehicle. The ratio of the weight of the airbag device to the weight of the steering wheel body to which the airbag device is mounted is prescribed so that the weight of the airbag device can be kept down. In this manner, the weight of the vehicle is kept down. Additionally, the ratio is such that the airbag is sturdy enough to withstand the inflation pressure and the impact of an occupant. Thus, a vehicle occupant is fully restrained while the weight of the vehicle is kept down by keeping the weight of the airbag down.

According to an embodiment of the present invention, the weight of a steering wheel of a vehicle should not be too heavy or too light. By prescribing the weight range of the steering wheel, the performance capability of the steering wheel can be optimized.

According to an embodiment of the present invention, by prescribing the weight of the airbag device, for example, as no greater than approximately 3 kg, the weight of the airbag device can be specifically kept down while still being sturdy enough to withstand the inflation pressure and impact of an occupant.

According to an embodiment of the present invention, by prescribing the yarns that form the airbag fabric as having a denier of, for example, no greater than 500, the airbag fabric is finer and the weight of the airbag can be kept down while fully protecting an occupant in an event of an emergency. The weight of the airbag can also be kept down, for example, by reducing or eliminating the amount of coating applied to the material and by reducing the number of airbag panels and seams.

According to an embodiment of the present invention, even when the restraint capability of the airbag is more or less reduced due to a use of a finer airbag fabric and a smaller inflator, by overhanging the airbag to the occupant side, the restraint capability can be enhanced.

It is to be understood that both the foregoing general description and the following detailed description are exemplary and explanatory only and are not restrictive of the invention claimed.

BRIEF DESCRIPTION OF THE DRAWINGS

These and other features, aspects, and advantages of the present invention will become apparent from the following description, appended claims, and the accompanying exemplary embodiments shown in the drawings, which are described briefly below.

DETAILED DESCRIPTION

Figure 1:
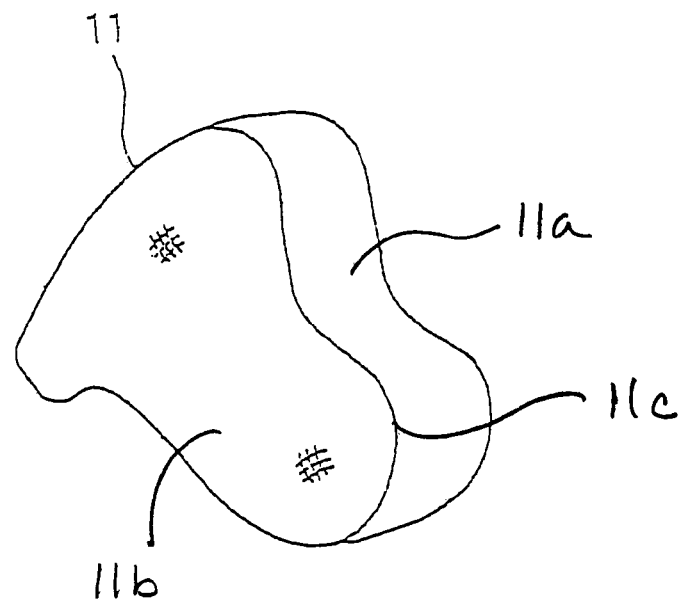
FIG. 1 shows a perspective view of an airbag according to an embodiment of the present invention.
Figure 2:
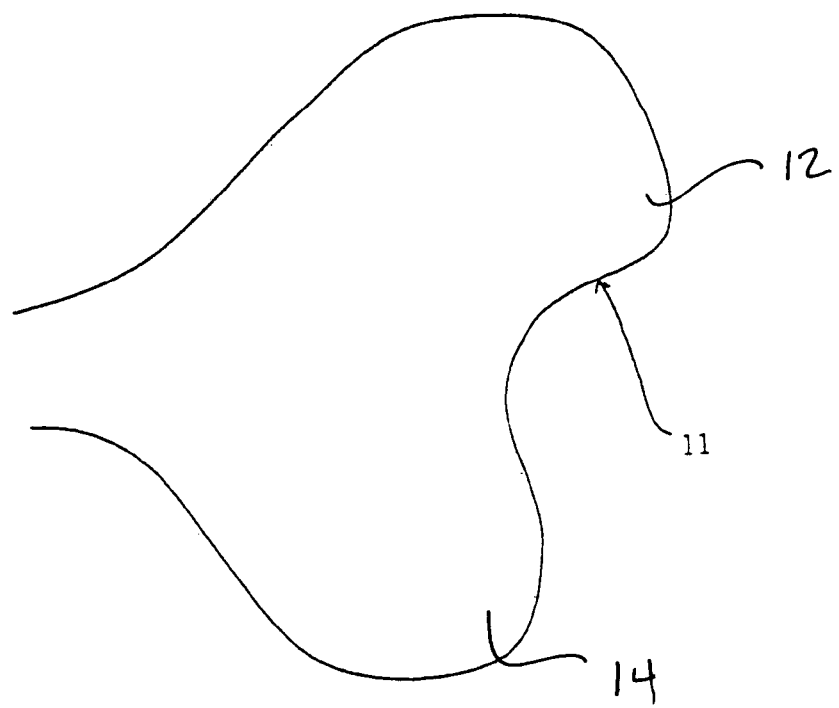
FIG. 2 shows a side view of an airbag with a top overhang according to an embodiment of the present invention.
Figure 3:
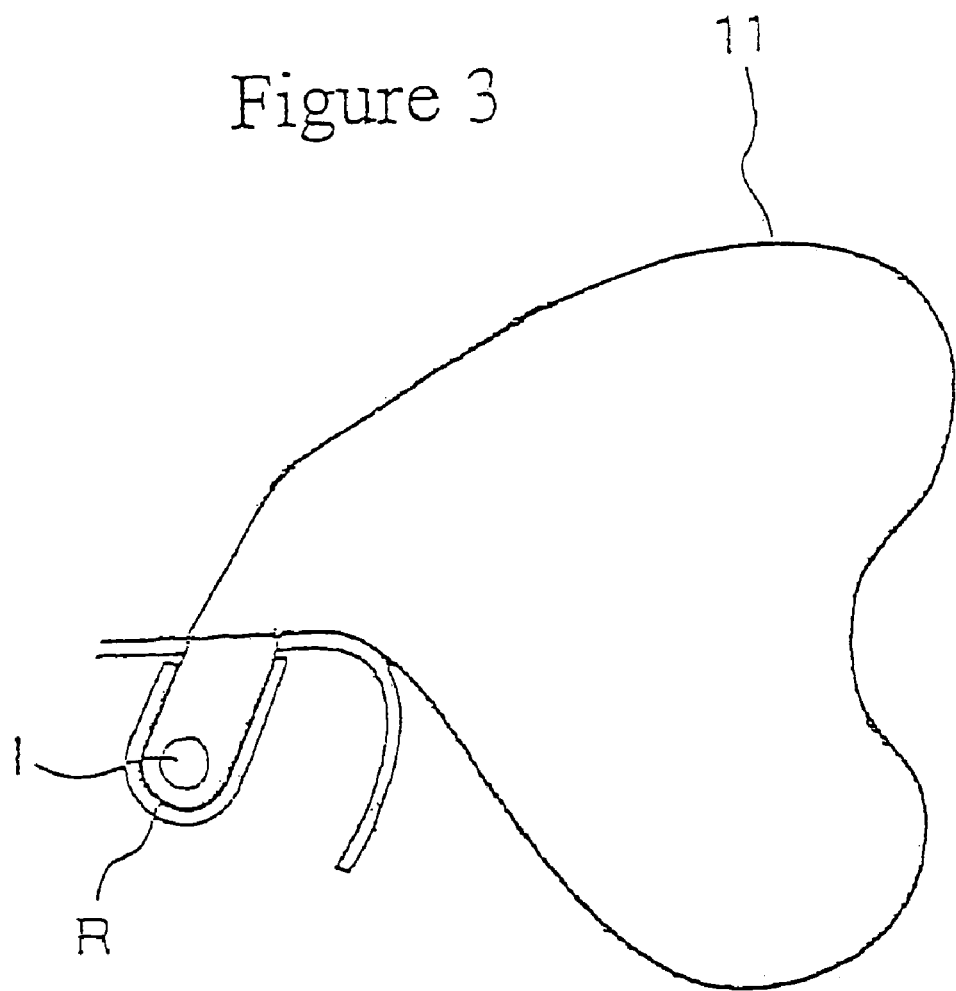
FIG. 3 shows a side view of an airbag according to an embodiment of the present invention in an inflated state.
Figure 4:
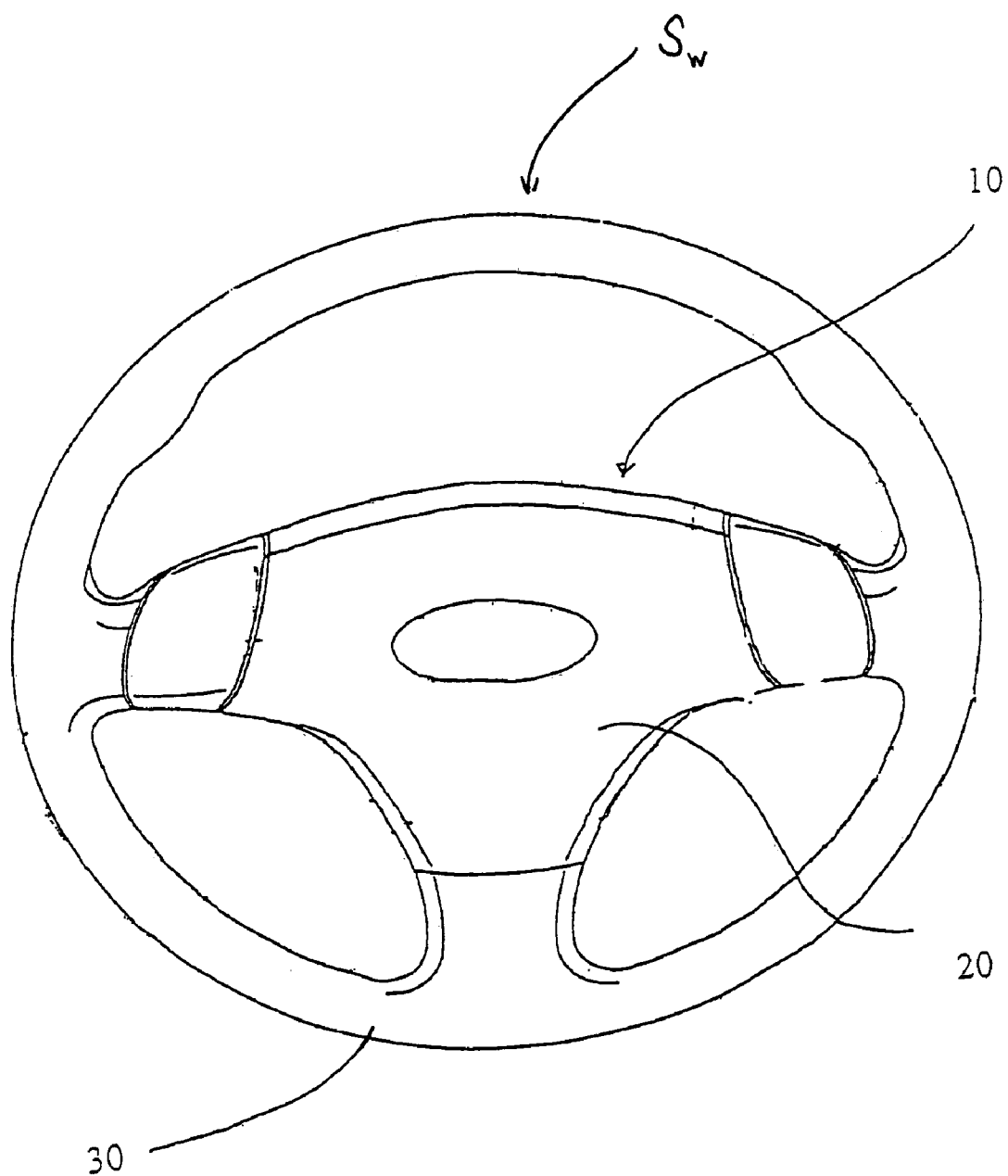
FIG. 4 shows a front view of a steering wheel according to an embodiment of the present invention.

Embodiments according to the present invention will be described with reference to the attached drawings. FIG. 1 shows an airbag according to an embodiment of the present invention. FIG. 2 shows a side view of an airbag with a top overhang according to an embodiment of the present invention. FIG. 3 shows a side view of an airbag according to an embodiment of the present invention in an inflated state. FIG. 4 shows a front view of a steering wheel according to an embodiment of the present invention.

According to an embodiment of the present invention, a steering wheel $S_w$ includes an airbag device 10 (i.e., an airbag module) and a steering wheel body 30. The airbag device 10 is mounted on the steering wheel body 30.

The airbag device 10 includes an airbag 11, a retainer R to which the airbag 11 is mounted, an inflator I for deploying the airbag, and a module cover 20 covering the airbag 11. The airbag 11 is stored in the airbag device 10 in a folded state (not shown). The airbag 11 is folded such that the airbag can expand as the airbag inflates. The airbag 11 and the inflator I are connected to the retainer R, which is connected to the steering wheel body 30. The module cover 20 covers the folded airbag 11. Thus, the steering wheel body 30 and the airbag device 10 together comprise the steering wheel $S_w$.

In the event of a vehicle emergency, such as a collision, the inflator I supplies expansion gas to the airbag 11. As the airbag 11 inflates, the airbag 11 expands and pushes against an interior side of the module cover 20, rupturing the module cover. After the module cover 20 ruptures, the airbag 11 continues to expand and deploy in a direction toward a vehicle occupant. In this manner, the inflated airbag receives and restrains the vehicle occupant.

According to an embodiment of the present invention, an advantageous weight of the airbag device 10 is no less than approximately 0.5 kg and no greater than approximately 3 kg. If the weight of the airbag device 10 is lighter than 0.5 kg, there may be vibration on the steering wheel $S_w$. Conversely, if the weight of the airbag device 10 is heavier than 3 kg, the weight of the vehicle in which the airbag device 10 is mounted is increased, which reduces the fuel efficiency of the vehicle.

According to an embodiment of the present invention, the ratio of the weight of the driver side airbag device 10 to the weight of the steering wheel body 30 may be no less than approximately 1:6 and no greater than approximately 1:2. If the ratio is more than approximately 1:2, the steering wheel $S_w$ becomes difficult to turn or easily tilts upward. Conversely, if the ratio is less than approximately 1:6, the steering wheel $S_w$ may be prone to vibration. For example, the ratio may be less than approximately 1:5; or less than approximately 1:4; or less than approximately 1:3. Preferably, the ratio is less than approximately 1:2.9. Additionally, if the airbag 11 is too light and thin, the strength of the airbag 11 may be insufficient to withstand the inflation pressure and to withstand the impact of the occupant.

According to an embodiment of the present invention, the weight of the airbag 11 is directly related to the thickness of the material from which the airbag 11 is constructed. If the material is thick, the airbag 11 will have a larger weight than if the material is thin. Thus, further advantages can be obtained when the airbag fabric is formed from yarns having a denier of no greater than approximately 500 because such fabric is fine and can be said to be small airbag fabric. The thin yarns provide an airbag fabric which is thin and lightweight and can be easily folded. Such an airbag fabric is sufficiently thin so that the weight of the airbag 11 can be kept down.

According to an embodiment of the present invention, the airbag 11 when inflated is preferably overhung to the occupant side. For example, as shown in FIG. 2, an upper portion 12 of the airbag 11 overhangs a lower portion 14 of the airbag 11. Thus, even when the restraint capability of the airbag 11 is reduced due to a use of a finer airbag fabric (or a smaller airbag) and a smaller inflator, the initial restraint capability of the airbag can be enhanced.

According to an embodiment of the present invention, an airbag requiring a coating or film is provided. For example, a coating may be applied to an airbag fabric in order to impart low permeability characteristics to the airbag so that the airbag inflates rapidly and efficiently. Application of a coating or film to the airbag fabric increases the weight of the airbag. According to this embodiment, in order to keep the weight of the airbag down, the amount of coating or film applied to the airbag is maintained less than or equal to about 150 grams per square meter of airbag material. Additionally, reducing the number of coatings applied to the airbag material will reduce airbag weight. For example, the number of coatings can be limited to two. Thus, the weight of the airbag is kept down relative to the weight of the steering wheel because the amount of coating or film applied to the airbag is kept down.

According to an embodiment of the present invention, an airbag is provided that is constructed of a material with low permeability characteristics. Such an airbag does not require a coating so the weight of the airbag can be kept down. For example, the airbag may be made of plastic. The airbag may also be made of an elastomer, such as resin, or of a fabric that can be tightly woven. When the filament yarns are thin, for example, 200 to 250 denier, the weave pattern or density is fine, thereby making the air permeability low. Gas leakage can be prevented even without a resin coating. Thus, the surface smoothness is improved and can further reduce the size of the airbag. Therefore, according to this embodiment, the weight of the airbag can be kept down relative to the weight of the steering wheel.

According to an embodiment of the present invention, an airbag of simple construction is provided. The airbag is constructed such that the number of panels and the number of airbag seams are minimized. By reducing the number of panels that make up the airbag, the number of seams, such as sewn seams, welded seams, and woven seams, is also reduced. Reducing the number of seams results in an airbag made of fewer materials, which reduces the weight of the airbag relative to the weight of the steering wheel. For example, according to an embodiment, the airbag 11 may include a first panel 11a and a second panel 11b as shown in FIG. 1. The first panel 11a and the second panel 11b may be joined (for example, by a seam 11c) at a periphery of the first panel 11a and a periphery of the second panel 11b.

As explained above, according to an embodiment of the present invention, by prescribing the weight ratio of the driver side airbag device to the steering wheel body, the weight of the airbag device is reduced and therefore the weight of the vehicle can be kept down.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is defined in the following claims.

What is claimed is:

1. An airbag device for protecting an occupant of a vehicle, comprising;
   an airbag module including an airbag;
   wherein the airbag module is configured to be disposed on a steering wheel body of a steering wheel of the vehicle; and
   wherein a ratio of a weight of the airbag device to a weight of the steering wheel body is no less than approximately 1:6 and no greater than approximately 1:2.

2. The airbag device of claim 1, wherein the ratio of the weight of the airbag device to the weight of the steering wheel body is less than about 1:5.

3. The airbag device of claim 1, wherein the ratio of the weight of the airbag device to the weight of the steering wheel body is less than about 1:4.

4. The airbag device of claim 1, wherein the ratio of the weight of the airbag device to the weight of the steering wheel body is less than about 1:3.

5. The airbag device of claim 1, wherein the ratio of the weight of the airbag device to the weight of the steering wheel body is less than about 1:2.9.

6. The airbag device of claim 1, wherein the airbag is a driver side airbag.

7. The airbag device of claim 1, wherein the airbag includes a fabric formed from yarns having a denier of no greater than 500.

8. The airbag device of claim 1, wherein the airbag includes a fabric formed from yarns having a denier of no greater than 400.

9. The airbag device of claim 1, wherein the airbag includes a fabric formed from yarns having a denier of no greater than 300.

10. The airbag device of claim 1, wherein the airbag includes a fabric formed from yarns having a denier of 200 to 250.

11. The airbag device of claim 1, wherein the airbag includes a low permeability material.

12. The airbag device of claim 11, wherein the low permeability material comprises plastic.

13. The airbag device of claim 11, wherein low permeability material comprises an elastomer.

14. The airbag device of claim 13, wherein the elastomer is resin.

15. The airbag device of claim 11, wherein the low permeability material is tightly woven.

16. The airbag device of claim 1, wherein the airbag includes a coating.

17. The airbag device of claim 16, wherein the coating is disposed on the airbag such that the amount of coating to airbag surface area does not exceed 150 grams of coating to 1 square meter of airbag surface area.

18. The airbag device of claim 16, wherein the airbag includes only one layer of coating.

19. The airbag device of claim 16, wherein the airbag includes two layers of coating.

20. The airbag device of claim 1, wherein the airbag includes a first panel and a second panel.

21. The airbag device of claim 20, wherein the first panel and the second panel are joined at a periphery of the first panel and a periphery of the second panel.

22. The airbag device of claim 1, wherein the airbag is configured to deploy toward a front portion of the occupant.

23. The airbag device of claim 1, wherein a portion of the airbag overhangs a main body of the airbag, and wherein the overhung portion overhangs toward the occupant.

* * * * *